United States Patent
Mühlbauer

(10) Patent No.: US 6,445,965 B1
(45) Date of Patent: Sep. 3, 2002

(54) METHOD AND ARRANGEMENT FOR SELECTING SAFETY PARAMETERS TO BE MONITORED

(75) Inventor: Gerhard Mühlbauer, Freilassing (DE)

(73) Assignee: Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 09/298,658

(22) Filed: Apr. 23, 1999

(30) Foreign Application Priority Data

Apr. 23, 1998 (DE) .......................................... 198 18 181

(51) Int. Cl.⁷ .................................................. G05B 9/02
(52) U.S. Cl. .......................................... 700/79; 700/12
(58) Field of Search ............................. 700/79, 12, 13, 700/21, 82, 275

(56) References Cited

U.S. PATENT DOCUMENTS

| | | | |
|---|---|---|---|
| 4,791,569 A | * 12/1988 | Suzuki | 701/102 |
| 4,977,529 A | * 12/1990 | Gregg et al. | 703/18 |
| 5,353,238 A | 10/1994 | Neef et al. | |
| 5,666,010 A | * 9/1997 | Stratiotis | 307/328 |

FOREIGN PATENT DOCUMENTS

| | | |
|---|---|---|
| DE | 29 03 978 | 8/1980 |
| DE | 36 10 620 | 1/1987 |
| DE | 42 13 171 | 4/1992 |
| DE | 41 40 693 | 6/1993 |
| DE | 43 41 082 A1 | 6/1995 |
| DE | 43 42 903 | 6/1995 |
| DE | 296 00 385 | 6/1996 |
| DE | 297 06 969 | 4/1997 |
| EP | 0 311 062 A1 | 4/1989 |
| EP | 0 436 818 B1 | 5/1994 |
| EP | 0 584 292 B1 | 5/1996 |
| WO | 84/02592 | 7/1984 |

\* cited by examiner

*Primary Examiner*—Leo Picard
*Assistant Examiner*—Zoila Cabrera
(74) *Attorney, Agent, or Firm*—Kenyon & Kenyon

(57) ABSTRACT

A method and apparatus for monitoring a safety condition of a device, receive data from a plurality of operating-state detectors of the device selected on the basis of a specific configuration of the device to signal dangerous operating conditions of the device. Furthermore, to eliminate the need to completely redesign a safety monitoring program in response to modifications or expansions of the device, all the safety parameters are stored in one memory. The use of an exchangeable memory further simplifies modification of the system. A specific identifier is employed to rule out the use of an incorrect memory and a check sum for the memory contents allows detection of any unauthorized change in the memory contents.

15 Claims, 3 Drawing Sheets

METHOD AND ARRANGEMENT FOR SELECTING SAFETY PARAMETERS TO BE MONITORED

FIELD OF THE INVENTION

The present invention relates to a method and apparatus for selecting safety parameters to be monitored as a finction of the configuration of a machine-tool.

BACKGROUND INFORMATION

It is generally known, when working with machine-tools, to isolate the working area from its immediate surroundings by using protective doors or gates. The purpose of this is to prevent injury to the machine operator in the event of a dangerous operating condition (tool breakage, improper tool or workpiece motion, or the like). To ensure that this protective measure cannot be by-passed, the protective doors are monitored and, in response to opening of the protective doors, axles of the machine-tool are shut down or their travel path is restricted. In addition, to improve operational safety, the actual positions of the axles of a machine-tool are monitored. This enables one to recognize and prevent any travel along the axes into an unauthorized area. In this context, to perform the monitoring operation and activate the safety-related measures, a special monitoring program is used, in which the detectors to be monitored for each individual configuration are defined.

This monitoring method has the drawback of not being flexible enough and not being adaptable to various machine-tool configurations. When the monitoring operation is implemented in a program, one must revise the entire program if one detail of the monitoring system, for example one safety parameter or one detector, is changed. In addition, monitoring programs of this kind turn out to be increasingly complicated due to the ever greater number of increasingly detailed machine-tool operating states to be monitored. Such systems are therefore, neither easily serviced nor easily modified.

SUMMARY OF THE INVENTION

Therefore, the object of the present invention is to provide a method and apparatus for implementing the procedure, which will make it possible to avoid the above-mentioned disadvantages. It is the aim of the present invention to devise a flexible plan for storing and selecting safety parameters as a function of a machine-tool configuration.

The method according to the present invention advantageously provides a memory for storing the safety parameters to be monitored for every conceivable machine-tool configuration, for example, the door switches of the protective doors, or the lines which carry the signals from the door switches to be monitored, and/or the coordinates of the protected zones to be monitored, or the lines used to transmit the coordinates to be monitored. On the basis of the data specifying the special machine-tool configuration, a memory is addressed, and from a table stored therein, the safety parameters to be monitored, such as door switches for the protective doors in question, and the minimum and maximum actual positions, are read out for each axel. Since the monitoring program according to the present invention utilizes these safety parameters that are read out from the memory, it can have a universal design, making it independent of any special machine-tool configuration. Therefore, the data for all possible machine-tool configurations required for a monitoring operation are centrally stored in one memory. At fixed intervals, a processor checks whether all signals of doors' switches output from the memory signal indicate closed protective doors, and whether the actual axel positions are located within the protected zone. Therefore, it is no longer necessary to constantly monitor all door switches and actual axel positions, but rather only those relevant to a safe operating condition of the machine-tool in the special configuration. If a monitored protective door is detected to be open, or if an axel position is outside of the protected zone, an error recovery routine is initiated. Steps are taken in performing this error recovery routine to re-establish a safe operating condition, for example, an axel recognized as defective is shut down, and a status message to this effect is output to the user.

BRIEF DESCRIPTION OF THE DRAWINGS

The present invention is elucidated in the following on the basis of specific embodiments shown in the below-described drawings.

DETAILED DESCRIPTION

Figure 1:
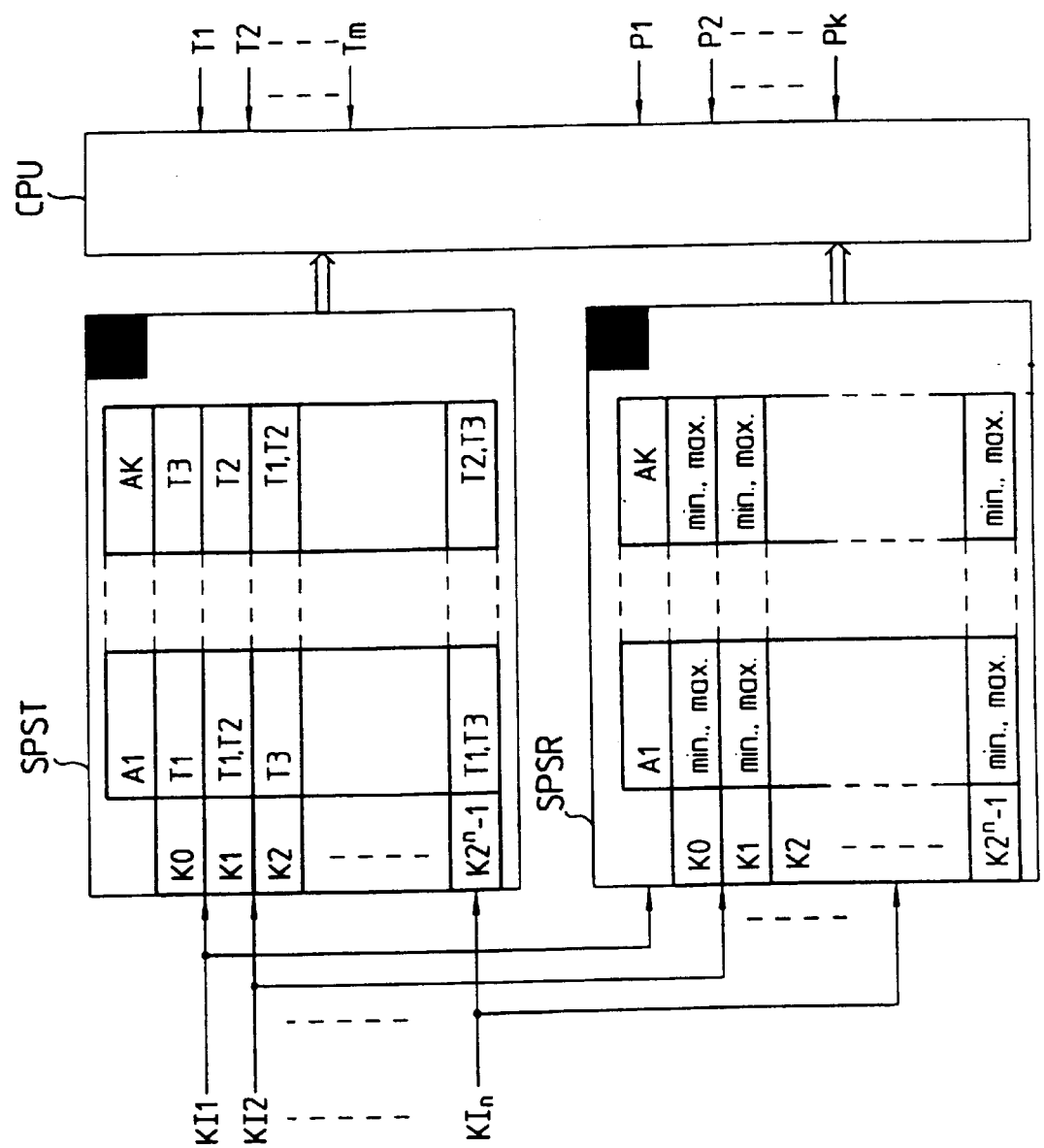
FIG. 1: a simple embodiment of the monitoring method according to the present invention.

FIG. 1 shows a realization of the arrangement according to the present invention in terms of circuit engineering. Via lines Kl1 through Kln, output signals are routed from detectors for configuring the machine-tool to the address bus of two memories SPST and SPSR. Thus, $2^n$ different configurations KO through $K2^n-1$ of the machine-tool to be monitored can be signaled through n lines Kl1 through Kln.

Stored in memory SPST is a table, which is partially read out on the basis of a supplied configuration KO through $K2^n-1$. For a configuration KO, the first row of the table is read out; for a configuration K1, the second row, etc. Contained in each row of the table, in memory SPST, are the safety parameters, for example door switches, to be monitored for this machine-tool configuration, ranked according to axles Al through Ak of that machine-tool, for which they signal a safe or unsafe operating condition. The table assigns to each axel Al through Ak, those door switches, whose corresponding protective doors must be closed to ensure a safe operating condition. For this, one column of the table is provided for each axel Al through Ak. The door switches, read out of memory SPST on the basis of a specific machine-tool configuration, are routed to a processor CPU. Alternatively to the door switches themselves, those lines can be indicated, via which the evaluating processor CPU receives the output signals from the door switches.

The processor reads in the output signals from only doors switches Tl through Tm transmitted from memory SPST via lines Tl through Tm of the same name, and compares them to internally stored output signals for the door switches indicative of a safe operating condition. Since it is only necessary for the processor CPU to monitor the relevant lines read out from the table, this constitutes a substantial reduction in workload for the processor CPU. If it is recognized in this comparison that the output signals from the relevant door switches stored in memory SPST match equal those that are read in, then a safe operating condition exists for the machine-tool. If an inequality is recognized for one of the output signals from a relevant door switch, an unsafe operating condition is recognized, and an error recovery routine is performed to return the machine-tool to a safe operating condition. This is achieved, for example, in that selected axles or all axles Al–Ak are shut down or driven into a retracted position. If an error routine is performed only for selected axles, those axles are selected, which have assigned to them in the table, the door switch which does not signal a safe operating condition.

In addition to selecting which door switches of the protective doors are to be monitored, the configuration KO through $K2^n-1$ of the machine-tool transmitted via lines Kl1 through Kln is used to determine, from memory SPSR, the dimensions of the protected zone for each of the axles Al through Ak, in which the actual position of each axel must be located to ensure a safe operating condition. Also stored in memory SPSR is a table in which maximum and minimum positional values are stored for each configuration KO through $K2^n-1$ and for each axel Al through Ak. A minimum positional value and a maximum positional value are assigned to that axel Al through Ak in whose tabular column it is found. As soon as a specific configuration is signaled via lines Kl1 through Kln to memory SPSR, memory SPSR outputs that tabular row assigned to this configuration, to the processor CPU. The processor CPU compares the whether actual positional values transmitted by the measuring systems via lines P1 through Pk lie in between the positional values transmitted by memory SPSR. If the actual positional values are not between the values transmitted by the memory SPSR, an unsafe operating condition is recognized, and an error recovery routine is performed. In the process, at least that axel is shut down which exceeded the maximum positional value, or which fell short of the minimum positional value.

If, for example, a high level is transmitted via line Kl2, and a low level is transmitted via all other lines Kl1, and Kl3 through Kln, by the detectors for the machine-tool configuration, configuration K2 is signaled to the two memories SPSR and SPST. In this context, the signals carried by lines Kl1 through Kln can be generated by switches which are automatically switched in response to a change in the machine-tool configuration. Configuration K2 prompts a row containing the door switches to be monitored and a row containing the minimum and maximum actual axel positions to be monitored, from the stored table in question, to be addressed in both memories SPST and SPSR.

In accordance with FIG. 1, the row addressed in memory SPST contains the information that for a safe operation, for example, of axel Al, the signal transmitted via line T1 must indicate a safe operating condition and the signal transmitted via line T3 must indicate a safe operating condition for axel Ak. This information pertaining to lines (T1 and T3 for axles Al and Ak) to be monitored for all axles Al through Ak, is fed to the processor CPU, which then compares the door-switch signals transmitted via these lines to stored signals indicative of a safe operating condition. If on one of the lines to be monitored, a signal is recognized which does not conform to the stored signal indicative of a safe operating condition, so that an unsafe operating condition is signaled, an error recovery routine is performed. In this context, at least those axles recognized as unsafe are shut down.

The row addressed in memory SPSR contains information about the minimally and maximally permissible actual position for each axel Al through Ak of the machine-tool. These positional data are likewise routed to the processor CPU, which compares the stored positions to the actual positions of axles Al through Ak determined by the machine-tool's measuring systems. If it is ascertained in this context that, for one or a plurality of axles, the measuring system supplies an actual position which does not lie between the maximally and minimally permissible position for the axel in question, an error recovery routine is likewise performed. In this error recovery routine as well, at least that axel is shut down whose measuring system has detected that the permissible values for the actual positions have been exceeded or fallen short of.

Figure 2:
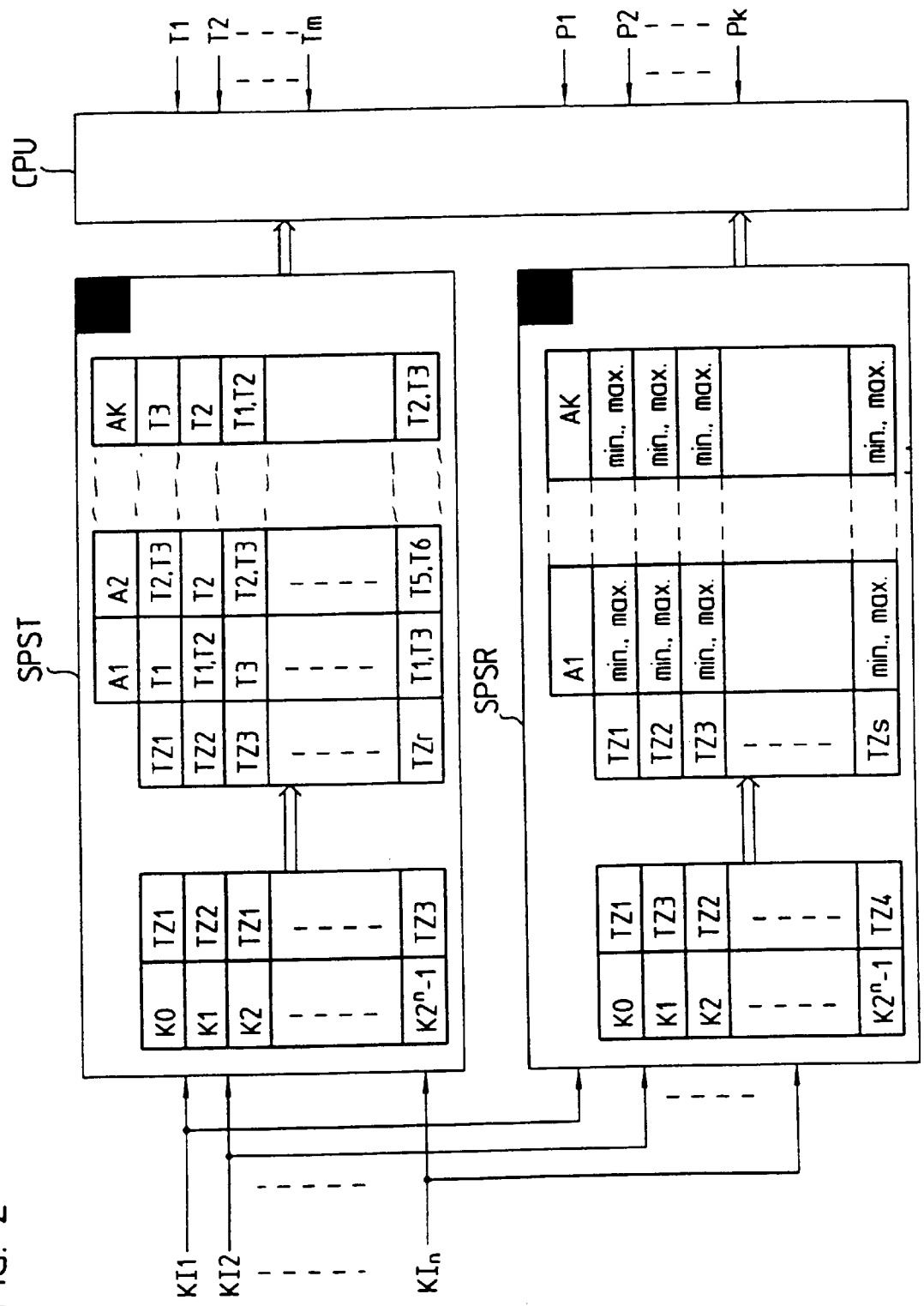
FIG. 2: the embodiment of FIG. 1, with additional index tables.

In addition to the monitoring system shown in FIG. 1, an index table is provided in FIG. 2. The index table is used to re-code the signal transmitted via lines Kl1 through Kln into an address for the tables containing the safety parameters stored in memories SPSR and SPST. Since different machine-tool configurations can, in fact, be theoretically signaled via lines Kl1 through Kln, but do not occur in reality, and since it is necessary that the same lines be monitored by the processor CPU for various configurations, it is not necessary that for each configuration K0 through $K2^n-1$ a row containing information is stored in memories SPSR and SPST for each configuration KO through $K2^n-1$. Therefore, one can economize on considerable memory space in memories SPST and SPSR.

If the user changes the machine-tool configuration, for example when working with a milling machine having reciprocal pendulum-type machining operation in two work rooms, by opening the door between the two work rooms, i.e., when the door is opened automatically by the milling machine's numerical control, this is recognized by an operating-state detector and routed via one of lines Kl1 through Kln to memory SPST and SPSR. By way of the two index tables for the protective doors and the protected zones, which can be stored in the same memories SPST and SPSR as the corresponding tables, the detector's output signal received via lines Kl1 through Kln is then re-coded into an address for the table of the door switches to be monitored and into an address for the table having maximally and minimally permissible actual positions of axles Al through Ak. The address in question is used in the corresponding table to read out that row having the safety parameters stored therein which is assigned to the configuration. The two rows contain information pertaining to the door switches to be monitored and to the actual axel positions which are maximally permissible in a safe operating state. This information is relayed to the processor CPU to control the monitoring operation. At this point, the output signals from the newly relayed door switches T1 through Tm which are transmitted over lines T1 through Tm of the same designation, to the processor CPU, as well as the new actual positions, are monitored by the processor CPU.

While before the door between the two work rooms opens, only that work room in which an axial movement takes place must be monitored for a safe operating condition, once the door is opened, both work rooms must be monitored. This can mean an increase in the number of door switches to be monitored, as well as in the size of the protected zone to be monitored.

Figure 3:
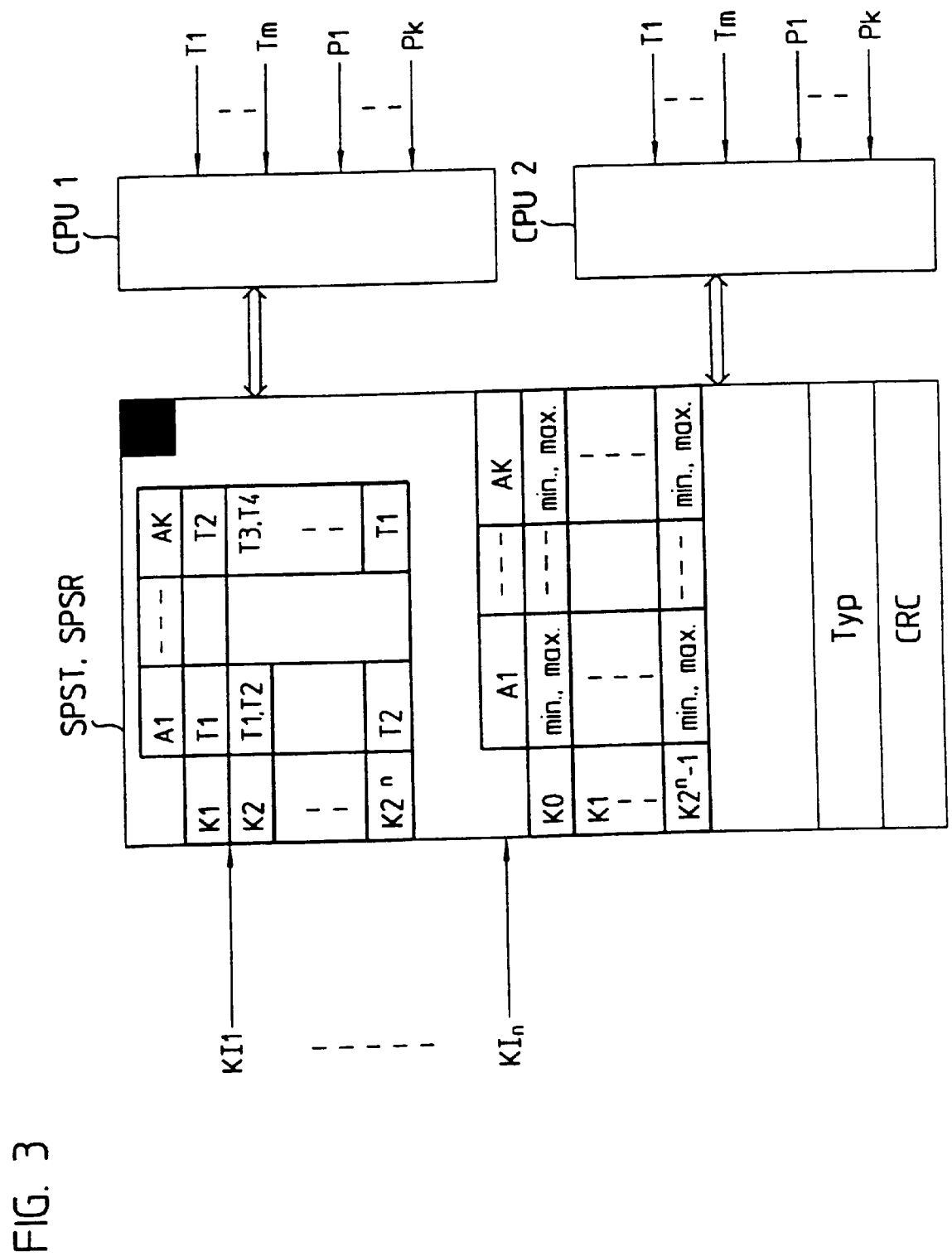
FIG. 3: the embodiment of FIG. 1, including only one physical memory and two processors.

As illustrated in FIG. 3, the two memories SPST and SPSR for the tables containing the safety parameters can be designed as one single mass memory containing the table with the door switches and the table with the protected zones for the various configurations. In addition, the index tables for accessing those tables containing the safety parameters, a type identifier for the machine-tool type, and a check sum CRC can be stored in this memory. Advantageous embodiments of this mass memory are an optical, a magnetic, or a semiconductor memory. A magnetic memory can be constituted as a diskette, an optical memory as a compact disk (CD), or as a digital versatile disk (DVD) for a numerical machine-tool control, when the numerical control also performs the monitoring functions. Another option is that the optical, magnetic, or semiconductor memory be in the form of an exchangeable card for a suitable reader/scanning unit.

Since both diskettes and cards can be easily mixed up, a type identifier is advantageously provided for the mass memory (as shown in FIG. 3), which is checked by a least one processor CPU. This check can be performed prior to each reading of safety parameters from the mass memory into the processor CPU. If the mass memory identification does not match the type identification stored in the processor CPU, an error message is output to the user. As a result, no additional information is read out of the mass memory, and the machine-tool axles are shut down. This is necessary because the configuration has changed, but the new safety parameters needed for the monitoring operation are not available. As a type identification, for example, a machine-tool type identifier can be used.

As an additional measure to safeguard against changes in the stored safety parameters, the table with the safety parameters also contains a check sum CRC, which likewise changes in response to a change in the safety parameters. In this context, the check sum can be produced in accordance with the cyclic-redundancy-check method or another known method. Immediately following the connection of a new memory SPST and/or SPSR to the machine, or after safety parameters are read out of at least one of the memories SPST or SPSR, the check sum CRC is re-calculated by at least one processor CPU and compared to the original check sum CRC stored in memory SPST or SPSR. When the re-calculated check sum does not conform to the original check sum, this is indicative of an unacceptable change in the safety parameters. In such a case, a suitable error recovery routine is performed, shutting down the machine and outputting an error message concerning the non-conforming check sum.

In addition or alternatively to the described safety parameters, (e.g., relating to door switches as well as maximum and minimum actual positions of axles A1 through Ak), other safety parameters can also be stored in the table; and adherence to these other parameters may be checked as every new machine-tool configuration occurs.

To redundantly monitor the safety parameters stored in the tables of memories SPST and SPSR, one may either use memories which can be accessed by the two processors CPU1 and CPU2, as depicted in FIG. 3, or one may use one memory for each processor CPU1 and CPU2, it being ensured that the memories have the same contents. The safety parameters read out as a function of the machine-tool configuration from the two tables by the two processors CPU1 and CPU2 or transmitted to the two processors CPU1 and CPU2 are then compared in the two processors CPU1 and CPU2, independently of one another, to the actual values of the safety parameters transmitted via lines T1 through Tm and P1 through Pk to the two processors CPU1 and CPU2. If only one of the two processors CPU1 or CPU2 recognizes an unsafe operating condition for the machine-tool, an error recovery routine is initiated.

The type identifiers stored in memories SPST and SPSR are also checked in both processors CPU1 and CPU2 for conformity with the type identifiers stored in processors CPU1 and CPU2 or in the memories assigned to these processors. In the same way, the check sum CRC stored in memories SPST and/or SPSR in both processors CPU1 and CPU2 is compared to the check sums CRC re-calculated by both processors CPU1 and CPU2, independently of one another.

What is claimed is:

1. A method for determining a safety condition of a machine tool, comprising the steps of:
   determining which of a plurality of configurations of the machine tool is a current configuration of the machine tool;
   based on the current configuration of the machine tool, selecting specific safety parameters from a plurality of safety parameters stored in a memory, the plurality of safety parameters relating to safety conditions of the plurality of machine tool configurations; and
   monitoring the specific safety parameters of the machine tool.

2. The method as recited in claim 1, wherein the specific safety parameters selected from the plurality of safety parameters stored in a memory based on the current machine tool configuration are read out of a memory and routed to at least one processor.

3. The method as recited in claim 2, wherein the safety parameters are compared by the processor to a corresponding plurality of predefined setpoint values.

4. The method as recited in claim 3, the machine tool including a plurality of detectors for detecting safety parameters, wherein data output by the detectors is either directly transmitted to the memory or initially re-coded as an address for the memory for selecting the specific safety parameters.

5. The method as recited in claim 4, wherein the data output from the detectors are re-coded into addresses by way of one or a plurality of index tables.

6. The method as recited in claim 2, wherein, before the specific safety parameters are selected, a processor checks an identifier signal stored in the memory and, when the check of the identifier signal indicates an incorrect identification, the machine tool is shut down.

7. The method as recited in claim 1, further comprising the steps of:
   after the connection of the memory and the selection of the specific safety parameters, a check sum is calculated by at least one processor based on contents of the memory; and
   the check sum is compared to a stored check sum value and, when the calculated check sum does not match the stored check sum value, the machine tool is shut down.

8. The method as recited in claim 1, wherein two processors carry out the method independently of one another and the results determined by the two processors are compared to one another and, when the results are unequal, the machine tool is shut down.

9. The method as recited in claim 1, further comprising the steps of:
   storing in memory required door switch positions of protective doors as the plurality safety parameters to be monitored, wherein each of the door switch positions respectively corresponds to one of a plurality of axles of the machine; and
   providing a table in the memory allocating the safety parameters to each of a plurality of axles, wherein protective doors must be in a closed position for a safe operating state of the plurality of axles.

10. The method as recited in claim 1, further comprising the steps of:
   assigning a maximum position value and a minimum position value for each of a plurality of axles of the machine;
   storing the maximum position value and the minimum position value in the memory as safety parameters to be monitored; and providing a table in the memory allocating to each of a plurality of axles the positions of the axles for a safe operating state.

11. An apparatus for monitoring a safety condition of a machine tool, wherein the machine tool includes a first plurality of mechanisms relating to safety conditions of the machine tool when the machine tool is in any of a plurality of configurations, comprising:

a memory connected to a first processor in which the plurality of safety parameters relating to safety conditions of the plurality of machine tool configurations are stored; and the memory is connected to the plurality of detectors for selecting from the plurality of stored safety parameters specific safety parameters relating to the current configuration of the machine tool; and the first processor connected to the detectors that monitor the selected specific safety parameters corresponding to the current configuration of the machine tool.

12. An apparatus as recited in claim 11, wherein the memory is an exchangeable memory.

13. The apparatus as recited in claim 11, wherein the memory is at least one of an optical, magnetic and semiconductor memory.

14. The apparatus as recited in claim 11, wherein the memory contains an identifier.

15. The apparatus as recited in claim 11, further comprising a second processor, the first and second processors being connected to the detectors and to the memory so that the first and second processors monitor the safety condition of the machine tool independently of one another.

* * * * *